United States Patent
Wipf et al.

(10) Patent No.: US 10,922,414 B2
(45) Date of Patent: Feb. 16, 2021

(54) POINT OF SALE DEVICE BUILD SECURITY

(71) Applicant: Target Brands, Inc., Minneapolis, MN (US)

(72) Inventors: Andrew James Wipf, Minneapolis, MN (US); David Pankratz, Minneapolis, MN (US); Joseph Eckberg, Minneapolis, MN (US); Kevin Newland, Minneapolis, MN (US); Adam Joseph Nawrocki, Plymouth, MN (US); Craig Ryan Janssen, Maple Grove, MN (US); Dylan Essing, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 161 days.

(21) Appl. No.: 16/149,931

(22) Filed: Oct. 2, 2018

(65) Prior Publication Data
US 2020/0104505 A1 Apr. 2, 2020

(51) Int. Cl.
*G06F 21/85* (2013.01)
*G06F 21/57* (2013.01)
*H04L 29/06* (2006.01)
*G06Q 20/20* (2012.01)
*H04L 9/32* (2006.01)
*H04W 12/08* (2009.01)

(52) U.S. Cl.
CPC ........ *G06F 21/575* (2013.01); *G06Q 20/202* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 7,086,584 | B2 * | 8/2006 | Stoutenburg | G06Q 20/04 235/379 |
| 8,514,450 | B2 * | 8/2013 | Kawano | G06F 3/1205 358/1.1 |
| 9,626,675 | B2 * | 4/2017 | Desai | G06Q 20/08 |
| 2004/0128199 | A1 * | 7/2004 | Cusack | G06Q 20/20 705/16 |
| 2007/0198820 | A1 | 8/2007 | Dickens et al. | |
| 2008/0201571 | A1 * | 8/2008 | Sethuraman | H04L 67/34 713/2 |
| 2009/0037284 | A1 * | 2/2009 | Lewis | G06Q 20/202 705/16 |

(Continued)

OTHER PUBLICATIONS

NETGEAR® Support, How do I configure Access Control or MAC Filtering on my router using the NETGEAR genie user interface?, (see, e.g., https://kb.netgear.com/23289/), Dated: Jun. 27, 2018, 5 Pages.

(Continued)

*Primary Examiner* — Venkat Perungavoor

(57) ABSTRACT

Devices, systems, methods, and computer program products for managing network access control with a build system are disclosed. The build system controls network filtering at retail stores based on identifiers of Point of Sale devices connected to the store's LAN (Local Area Network). This filtering places only authorized devices on a virtual LAN within the LAN that is reserved for POS terminals. The network access control is managed by a process built into the build system.

14 Claims, 7 Drawing Sheets

(56) References Cited

U.S. PATENT DOCUMENTS

| | | | | |
|---|---|---|---|---|
| 2010/0050169 A1* | 2/2010 | Dehaan | ............... | G06F 8/61 |
| | | | | 717/178 |
| 2012/0290422 A1* | 11/2012 | Bhinder | ............. | G06Q 20/20 |
| | | | | 705/21 |
| 2013/0091534 A1* | 4/2013 | Gilde | ............. | H04L 63/0227 |
| | | | | 726/1 |
| 2015/0074765 A1* | 3/2015 | Haight | ............. | H04L 63/083 |
| | | | | 726/4 |
| 2017/0249677 A1* | 8/2017 | Balar | ............. | G06Q 20/32 |
| 2018/0176218 A1* | 6/2018 | Moreno | ........... | H04L 63/0815 |
| 2018/0367518 A1* | 12/2018 | Singh | ............ | H04L 63/10 |
| 2019/0028892 A1* | 1/2019 | Henry | ............ | H04L 9/3271 |

OTHER PUBLICATIONS

Stack Overflow Network, Security provided through MAC filtering: Wired vs Wireless Networks, Dated: Nov. 1, 2013, 3 Pages.

Microsoft, Enable and Configure MAC Address Filtering, (see, e.g., https://technet.microsoft.com/en-us/library/), Dated: Aug. 6, 2018; 1 Page.

FOGUserGuide—FOG Project—A guide to deployment, management, and concept overview for FOG, (based on a document by: Thomas J. Munn CISSP) (see, e.g., (https://wiki.fogproject.org/); Dated: Aug. 6, 2018; 18 Pages.

LINKSYS™—Enabling Wireless MAC Filter on Linksys Wireless-N routers, (see, e.g., (https://www.linksys.com/us/support), Dated: Jun. 27, 2018; 7 Pages.

Opsi manual opsi version 4.1, Dated Jun. 8, 2018; 377 Pages.

PacketFence—Clustering Quick Installation Guide for PacketFence version 8.1.0; Dated: Jul. 2018; 36 Pages.

PacketFence—Developer's Guide for PacketFence version 8.1.0; Dated: Jul. 2018; 28 Pages.

PacketFence—Installation Guide for PacketFence version 8.1.0; Dated: Jul. 2018; 246 Pages.

PacketFence—Network Devices Configuration Guide for PacketFence version 8.1.0; Dated: Jul. 2018; 205 Pages.

Wikipedia—VLAN Management Policy Server (see, e.g., https://en.wikipedia.org/w/index.php?title=VLAN_Management_Policy_Server&oldid=841435715); Dated: May 18, 2018; 1 Page.

Hoffman, Chris, Why You Shouldn't Use MAC Address Filtering on Your Wi-Fi Router; Dated: Dec. 9, 2014; 9 Pages.

\* cited by examiner

POINT OF SALE DEVICE BUILD SECURITY

BACKGROUND

Point of sale (POS) devices, such as registers, can be located in most retail stores. POS terminals handle purchase transactions and also store key information relating to, for example, making purchases, returns, price look-ups, and discount requests. POS terminals may vary in form, from cashier-operated devices to customer-operated devices (e.g., a self-check-out register). Some retailers employ a combination of POS device models—from newer models to older models, each requiring the same level of customer functionality. POS devices are critical to a retailer's day-to-day business transactions and any failure of a POS device may result in loss of revenue for the business. It is with respect to these and other general considerations that embodiments have been described.

SUMMARY

In summary, devices, systems, methods, and computer program products for managing network access control with a build system are described.

In an example, there is a system that includes a store LAN (Local Area Network), a build system remote from the store LAN having build system memory, and a NAC system. The NAC system includes NAC system memory having NAC system instructions that when executed by a NAC system processor cause the NAC system processor to: obtain the POS device identifier; and add the POS device identifier to an access data store. The store LAN includes a managed network switch, and a Point of Sale (POS) device having a POS device identifier and a communication link to the managed network switch. The managed network switch is configured to control access to the store LAN using the access data store. The build system memory includes build system instructions that when executed by a build system processor cause the build system processor to: receive the POS device identifier, add the POS device identifier to a build system data store, provide the POS device identifier to a Network Access Control (NAC) system, and control deployment of a build image to devices based on the build system data store.

In an example, the managed network switch is further configured to provide a first VLAN (Virtual LAN) and provide a second VLAN. In an example, controlling access to the store LAN using the access data store includes adding the POS device to the first VLAN based on the POS device identifier of the POS device being located in the access data store. In an example, the managed network switch is configured to: permit devices connected to the first VLAN to access a build environment managed by the build system; and disallow devices connected to the second VLAN from accessing the build environment. In an example, the POS device identifier is a Media Access Control (MAC) address of the POS device. In an example, the POS device identifier includes the MAC address of the POS device and one or more of: operating system data of the POS device, patch data of the POS device, or device mode data of the POS device. In an example, the build system instructions further cause the build system processor to: poll the build system data store for changes; and responsive to determining a modification, provide modification data to the NAC system, wherein the modification data comprises the POS device identifier. In an example, obtaining the POS device identifier from the build system data store includes receiving the modification data. In an example, the communication link is a wired connection from the POS device to the managed network switch. In an example, the build system is configured to provide a build system user interface. In an example, receiving the POS device identifier comprises receiving the POS device identifier over the build system user interface.

In an example, there is a method that includes: receiving a Point of Sale (POS) device identifier associated with a POS device; adding the POS device identifier to a build system data store; control deployment of a build image to be provided to the POS device based on the build system data store; providing the POS device identifier from the build system data store to a network access control system; adding the POS device identifier to an access data store; receiving, at a managed network switch of a store LAN (Local Area Network), the POS device identifier from the POS device over a communication link; and permitting the POS device to access a build environment based on the POS device identifier being within the access data store.

In an example, permitting the POS device to access the build environment comprises adding the POS device to a first VLAN (Virtual LAN) of the store LAN, wherein the first VLAN is associated with the build environment. In an example, the method further includes receiving, at the managed network switch and from an unauthorized device, an unauthorized device identifier associated with the unauthorized device; and disallowing the unauthorized device from accessing the build environment based on the unauthorized device identifier being absent from the access data store. In an example, disallowing the unauthorized device from accessing the build environment includes adding the unauthorized device to a second VLAN of the store LAN, the second VLAN lacking access to the build environment. In an example, disallowing the unauthorized device from accessing the build environment comprises disallowing the unauthorized device from joining the store LAN. In an example, the method further includes causing the build image to be provided to the POS device to cause the POS device to boot from the build image; and populating the build system data store with POS device build data based on the POS device booting from the build image. In an example, the method further includes receiving a decommission device request associated with the POS device; setting a flag in the build system data store to cause the POS device to boot from a decommission build image; and removing the POS device identifier from the access data store responsive to determining that the POS device booted from the decommission build image.

In an example, there is a method including: receiving authorized user credentials from an administrator device; providing a build system user interface to the administrator device; receiving over the build system user interface a POS device identifier of a POS device; adding the POS device identifier to a build system data store; polling the build system data store for a modification; providing modified data to a Network Access Control (NAC) system to allow a device associated with the modified data to access a build system; causing the POS device to boot from a build image based on the build system data store; receiving POS device build data from the POS device; and populating the build system data store with the POS device build data.

In an example, the modification includes an addition or removal of a device identifier. The method of claim 16, wherein providing the modification data to the NAC system includes providing the modification data using an API (Application Programming Interface) associated with the NAC system. In an example, the method further includes receiving, over the build system user interface, a decommission device request associated with the POS device; and setting a flag in the build system data store to cause the POS device to boot from a decommission build image. In an example, the method further includes providing the POS device identifier to the NAC system to disallow the POS device from accessing the build system responsive to determining that the POS device booted from the decommission build image.

BRIEF DESCRIPTION OF THE DRAWINGS

Non-limiting and non-exhaustive examples are described with reference to the following figures.

DETAILED DESCRIPTION

Figure 1:
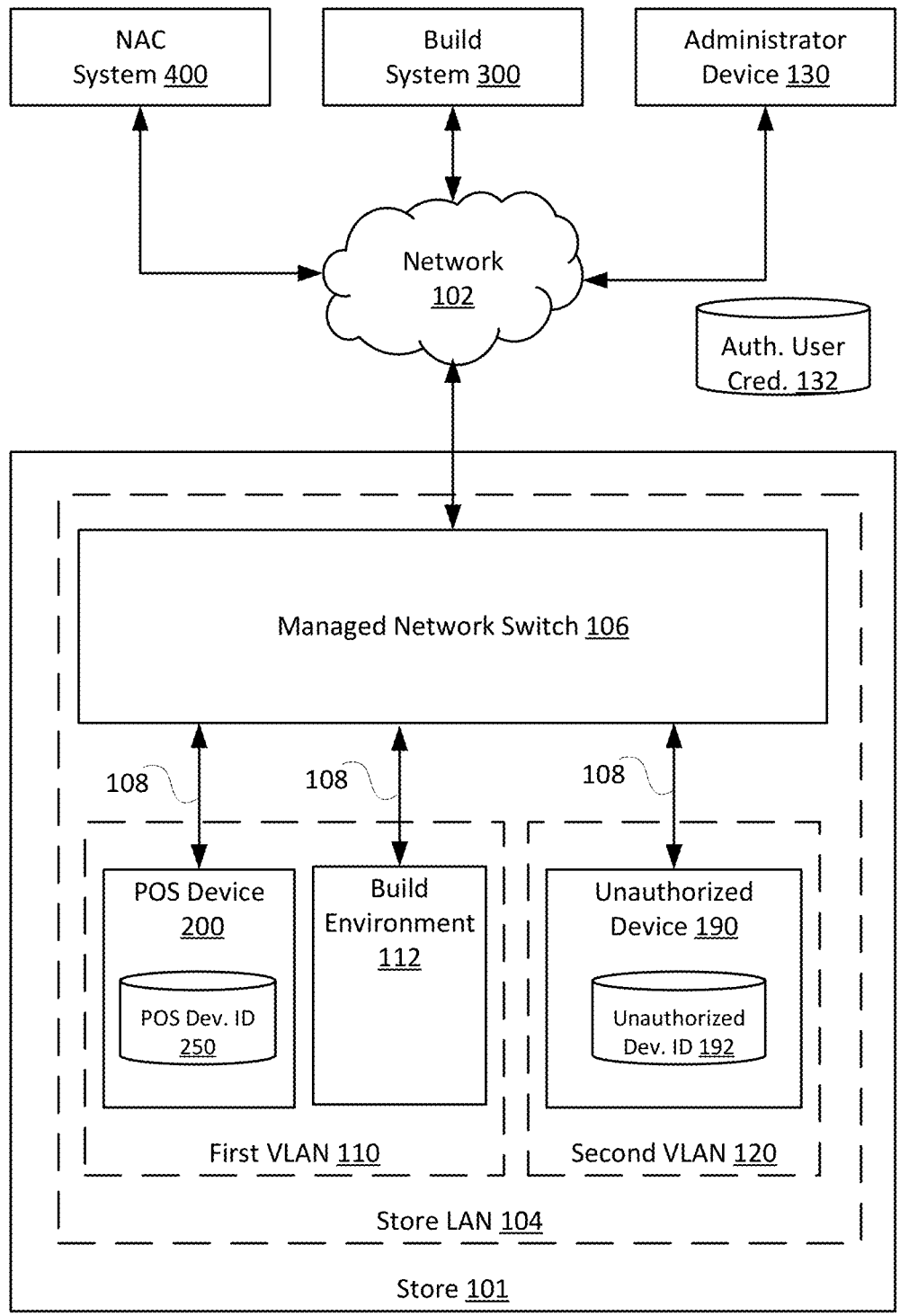
FIG. 1 illustrates an example system for managing network access control and controlling build processes from a central build system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Disclosed examples relate to devices, systems, methods, and computer program products for managing network access control with a build system. In an example application of the technology to Point of Sale (POS) devices of a store, the build system controls network filtering at remote stores based on identifiers of devices connected to the store's LAN (Local Area Network). The use of this filtering places only authorized devices on a VLAN (Virtual LAN) within the LAN that is reserved for POS devices. This increases security by preventing unauthorized devices from accessing the POS VLAN and beginning a build process from a build environment of the POS VLAN. This further simplifies the configuration of store networks by allowing other devices connected to the store's LAN (e.g., security cameras and wireless access points) to be automatically assigned to a separate VLAN from the POS VLAN. The network access control is managed by a process built into the build system, which allows for ease of administration and increased efficiency in the process of provisioning new POS devices.

Disclosed embodiments provide enhanced security by, for example, controlling access to a store's build environment by performing network filtering based on hardware identifiers of devices connected to the LAN. For instance, a MAC (Media Access Control) address of a device can be used as the hardware identifier. With such filtering enabled, the LAN is configured to allow only certain devices (e.g., as controlled via a list of authorized MAC addresses) to access the network and start the build process. The list of authorized identifiers is used by the store server to limit access by unauthorized devices. The list can be modified by an administrator using the build system, which provides a user interface for controlling the list of authorized identifiers. In this manner, the security of multiple, remote build processes can be efficiently controlled at a centralized location.

FIG. 1 illustrates an example system 100 for managing network access control and controlling build processes from a build system 300. The system 100 includes a store 101, a network 102, an administrator device 130, a build system 300, and a Network Access Control (NAC) system 400. The store 101 includes a store Local Area Network (LAN) 104. The store LAN 104 includes a managed network switch 106 having a communication link 108 to a Point of Sale (POS) device 200, a build environment 112, and an unauthorized device 190.

The store 101 is an establishment that provides goods or services. To facilitate the providing of goods or services, the store 101 has one or more POS devices, such as POS device 200. The store 101 can have different sections, each having different kinds of POS devices. For instance, the store 101 can have a specialty department, such as a pharmacy or coffee shop, having one or more POS devices customized for the particular needs of the department. While the store 101 is typically associated with a brick-and-mortar building within which the POS device 200 and other components are disposed, the store 101 can take other forms.

The store LAN 104 is a network of computing devices associated with the store 101. The store LAN 104 facilitates communication of data among connected devices using one or more communication links 108. The store LAN 104 can also facilitate the transmission of power for connected devices, such as by using power over Ethernet. The store LAN 104 can include one or more: routers, switches, mobile access points, bridges, hubs, intrusion detection devices, storage devices, server devices, sensors, firewall devices, and other types of computing devices. The store LAN 104 includes a managed network switch 106 to manage the flow of data.

The managed network switch 106 is a computer networking device that manages the flow of data within the store LAN 104, such as by routing data communications among devices connected to the store LAN 104. The managed network switch 106 receives and transmits data over the communication links 108. The managed network switch 106 is also typically connected to a wider network 102, such as the Internet, to facilitate communication with devices outside of the store LAN 104. The managed network switch 106 can be remotely controlled or managed by various components, including the NAC system 400 and the administrator device 130. In an examples, the managed network switch 106 provides Dynamic Host Configuration Protocol (DHCP) services directly or through another device. The managed network switch 106 is connected to devices on the store LAN 104 via communication links 108.

The communication links 108 are connections between two or more devices to facilitate data transmission among the connected devices. The communication links 108 can include wired or wireless links. The communication links 108 can take a variety of forms including wired Ethernet connections and wireless WI-FI connections, among others. While the communication links 108 may connect all devices to a same LAN, the managed network switch 106 can segment the store LAN 104 into one or more virtual LANs (VLANs), such as a first VLAN 110 and a second VLAN 120.

The first VLAN 110 and the second VLAN 120 are VLANs. A VLAN is a software-defined subnetwork of a larger LAN. Advantageously, VLANs allow for improved security by limiting discoverability of devices and limiting the reach of communications. Here, the first VLAN 110 and the second VLAN 120 are defined by the managed network switch 106 segmenting the store LAN 104. In the example, the first VLAN 110 is a VLAN for authorized devices and, in particular, for one or more POS devices 200 and the build environment 112. As will be described in more detail, below, the managed network switch 106 allows only authorized devices to be on the first VLAN 110. In this manner, access to the build environment 112 is controlled and security is enhanced. Unauthorized devices, such as the unauthorized device 190, are denied access to the first VLAN 110. For instance, such devices are added to the second VLAN 120 (which is segmented from the first VLAN 110) or are prevented from accessing other devices by the managed network switch 106. In this manner, access to the build environment 112 is controlled.

The build environment 112 facilitates the deployment of software packages to computing devices and includes one or more virtual or physical computing devices. The software packages are typically bootable images, but can also include operating systems, patches, firmware, and applications. In the illustrated example, the build environment 112 facilitates deployment of software packages exclusively to computing devices on the first VLAN 110. The build environment 112 does not facilitate deployment of software packages to the second VLAN 120. In an example the build environment 112 includes a server hosting a Preboot eXecution Environment (PXE). Although illustrated as being within the first VLAN 110, the build environment 112 can include components outside of the first VLAN 110.

The network 102 is a computer network, such as an enterprise intranet and/or the Internet. The network 102 can include a LAN, a Wide Area Network (WAN), the Internet, wireless and wired transmission mediums. Devices on the store LAN 104 can communicate with devices connected to the network 102 via, for example, the managed network switch 106.

The administrator device 130 is a computing device used by an administrator of the system 100 to control the system 100. The administrator is a credentialed user. The administrator uses authorized user credentials 132 to access and control components of the system 100.

The POS device 200 is a computing device that facilitates providing goods or services by the store 101. In many examples, the POS device 200 handles purchase transactions. The POS device 200 can also store key information relating to making purchases, returns, price look-ups, and discount requests, among other information. An example implementation of the POS device 200 is described with more detail in relation to FIG. 2.

The build system 300 is a system for facilitating the centralized control and monitoring of the deployment of software packages to computing devices across one or more stores, including store 101. The build system 300 can be used to schedule deployment of packages to devices, monitor the deployment of packages, and perform cache warming, among other features. An example implementation of the build system 300 is described with more detail in relation to FIG. 3. The build system 300 cooperates with the build environment 112 of the store 101 to deploy software packages to the POS device 200.

The NAC system 400 is a system for controlling various networks, including the store LAN 104. Controlling networks includes controlling which devices can access which networks, as well as monitoring network utilization. An example implementation of the NAC system 400 is described with more detail in relation to FIG. 4.

Overall, the components of the system 100 cooperate to facilitate the deployment of software packages to a POS device 200 in a secure manner from a build system 300. In an example, the POS device 200 is configured to make a boot request over the first VLAN 110 upon powering-on. For instance, the POS device 200 makes a Preboot eXecution Environment (PXE) request. The build environment 112 includes a server connected to the first VLAN 110 that receives the PXE boot request and forwards it to a DHCP server. The DHCP server can be located on the first VLAN 110, outside of the first VLAN 110, on the store LAN 104, or elsewhere (e.g., located remote from the store 101 as part of the build system 300). The POS device 200 receives, from the DHCP server, an assignment of an Internet Protocol (IP) address and boot options that direct the POS device 200 to boot from the build environment (e.g., boot based on data received from a server thereof). The build environment 112 contacts the build system 300 for determining the device name and what to build based on an identifier of the POS device 200 (e.g., a hardware identifier of a network interface card of the POS device 200). The build environment 112 obtains a build image and applies the build image to the POS device 200. The POS device 200 boots from the build image. With the build system 300 being connected in this process, the build system 300 can monitor the health of the devices on the store LAN 104 and the status of the boot process. Additionally, the build system 300 can provide a user interface for administrators to control and monitor the build process (e.g., schedule deployment of software packages to the devices).

Figure 2:
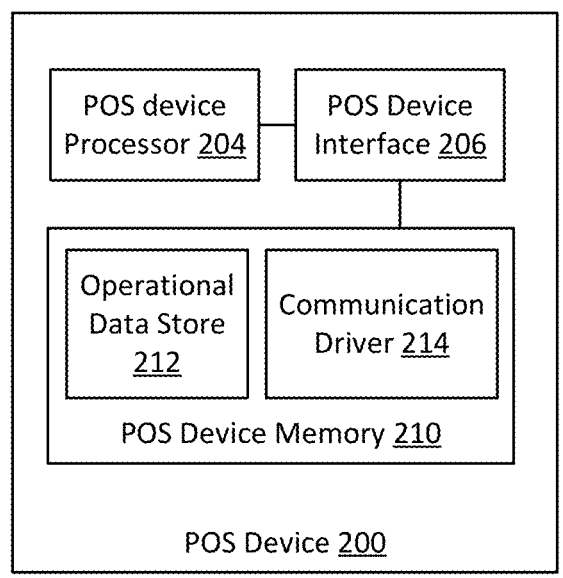
FIG. 2 illustrates a block diagram of a point of sale device.

FIG. 2 illustrates a block diagram of an example implementation of the POS device 200. The POS device includes a POS device processor 204, a POS device interface 206, a POS device memory 210, an operational data store 212, and a communication driver 214.

The POS device processor 204 is a computer processor. The POS device interface 206 is one or more hardware or software components that allow the POS device 200 to interact with other devices or a user. In many examples, the POS device interface 206 includes a display screen for displaying information to a user, an input device for receiving input from a user (e.g., a keyboard), and a wired or wireless network interface card for connecting to the store LAN 104. In some examples, the POS device interface 206 includes or is connected to specialized hardware for acting as a POS device, such as a barcode scanner, payment terminal (e.g., credit card reader), or a scale, among other hardware.

The POS device memory 210 is computer memory with data stored thereon. In the illustrated example, the POS device memory 210 includes an operational data store 212 and a communication driver 214.

The operational data store 212 is a data store for data generated or used by the POS device. The operational data store 212 includes, for example, instructions for operating as a POS device 200. The data in the operational data store 212 can be overwritten, generated, or modified based on software packages received from the build environment 112.

The communication driver 214 includes software instructions that enable the POS device 200 to communicate with other devices on a network. In some embodiments, the communication driver 214 includes instructions suitable for communicating with the build environment 112 to obtain software packages for installation at the POS device 200.

Figure 3:
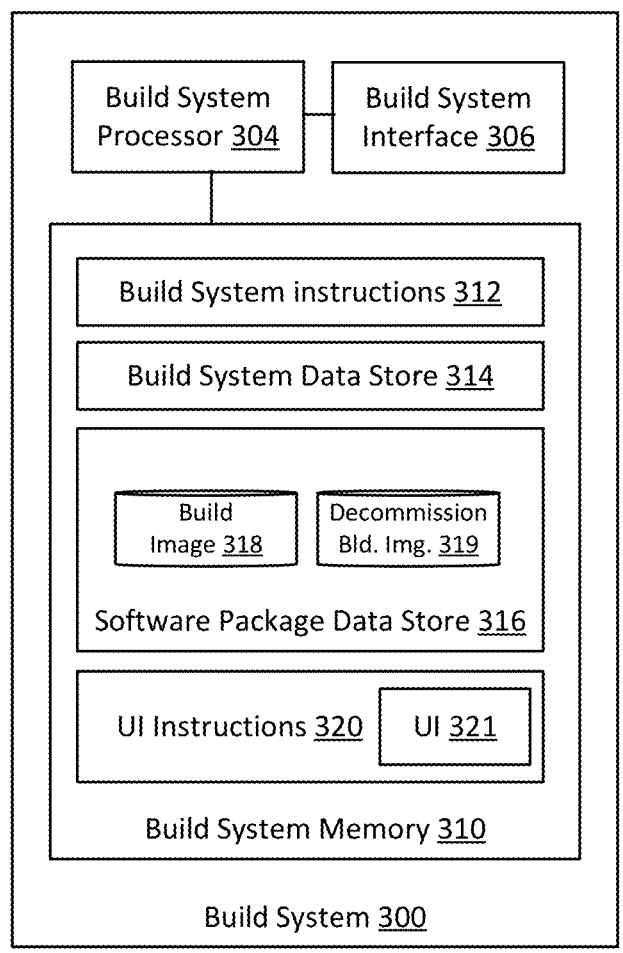
FIG. 3 illustrates a block diagram of a build system.

FIG. 3 illustrates a block diagram of an example implementation of the build system 300. The build system 300 includes a build system processor 304, a build system interface 306, a build system memory 310, build system instructions 312, a build system data store 314, a software package data store 316, and user interface instructions 320.

The build system processor 304 is a computer processor. The build system interface 306 is one or more hardware or software components that allow the build system 300 to interact with other devices or a user. In many examples, the build system interface 306 includes a display screen for displaying information to a user, an input device for receiving input from a user (e.g., a keyboard), and a wired or wireless network interface card for connecting to the store LAN 104. In some examples, the build system 300 is a headless server operated over the network 102 by another device, such as the administrator device 130.

The build system memory 310 is computer memory that stores build system instructions 312, a build system data store 314, a software package data store 316, and User Interface (UI) instructions 320.

The build system instructions 312 are computer readable instructions that, when executed by the build system processor 304, cause the build system processor to perform one or more operations, including one or more operations described in relation to FIG. 5.

The build system data store 314 is a data store that stores data relating to a build process and associated POS devices 200. In many examples, the build system data store 314 includes a database having entries describing aspects of POS devices 200, including names, physical locations, network addresses, build profiles, hardware profiles, software profiles, device identifiers, and statuses, among other aspects.

The software package data store 316 is a data store that includes one or more software packages for deployment to POS devices 200, including build images 318. The build images 318 are software images of pre-configured software environments for a reference POS device 200. The build image 318 can then be used to rapidly configure POS devices 200 that are similar to the reference POS device 200. The software package data store 316 can include a variety of build images 318 for different reference POS devices 200 that may have different kinds of hardware or software, such as a build image 318 for pharmacy devices, a build image 318 for coffee shop devices, a build image for old model POS devices 200, and a build image for new model POS devices 200, among others. The build images 318 can further include special decommission build images 319 for use in decommissioning a POS device 200. The decommission build images 319 can include special software or instructions to prepare a POS device 200 for being decommissioned, such as causing the POS device 200 to: wipe a drive in a specific manner (e.g., in a manner complying with a standard for data sanitization), deregister software, and deregister hardware. The software package data store 316 can further include non-build image software packages, including applications and packages.

The user interface instructions 320 are instructions for providing a build system user interface 321 for the build system 300 usable by an administrator to control and monitor aspects of the build system 300.

In an example, the user interface instructions 320 include instructions for providing a dashboard service that causes the build system user interface 321 to illustrate the status of each POS device 200 controlled by the build system 300. The build system user interface 321 can be generated in response to a request from the administrator device 130. The build system user interface 321 can include a view displaying the status of all POS devices 200 in the system 100, a view displaying the status of POS devices 200 in one or more stores, or a view displaying the status of POS devices in a particular store 101. Alternatively or additionally, the build system user interface 321 includes views based on a region so as to display the status of POS devices per state, per region (e.g., Midwest, east coast, upper west coast, lower west coast, southwest, etc.), per country, or per continent, among other geographic demarcations. Alternatively or additionally, the build system user interface 321 includes views based on a particular store, in one or more departments, in one or more specialty stores, and so on.

Figure 4:
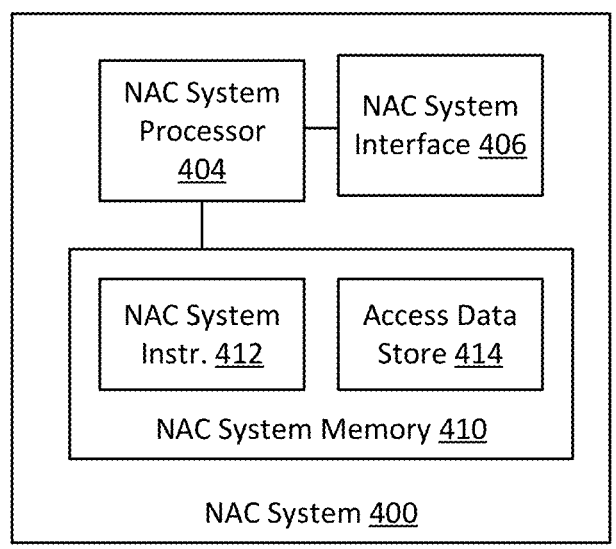
FIG. 4 illustrates a block diagram of a network access control system.

FIG. 4 illustrates a block diagram of an example implementation of the NAC system 400. The NAC system 400 includes a NAC system processor 404, a NAC system interface 406, a NAC system memory 410, NAC system instructions 412, and an access data store 414.

The NAC system processor 404 is a computer processor. The NAC system interface 406 is one or more hardware or software components that allow the NAC system 400 to interact with a user or devices. In some examples, the NAC system 400 includes a display screen for displaying information to a user, an input device for receiving input from a user (e.g., a keyboard), and a wired or wireless network interface card for connecting to the store LAN 104. In some examples, the NAC system 400 is a headless system operated over the network by another device, such as the administrator device 130. The NAC system memory 410 is computer memory having stored thereon NAC system instructions 412 and an access data store 414.

The NAC system instructions 412 are computer-readable instructions that, when executed by the NAC system processor 404, cause the NAC system processor 404 to perform one or more operations, including one or more operations described herein in relation to FIG. 5. The access data store 414 is a data store that stores data relating to controlling which devices can access a network. For instance, the access data store 414 can store a list of devices (e.g., identified by a device identifier) that are permitted to access the first VLAN 110.

Figure 5A:
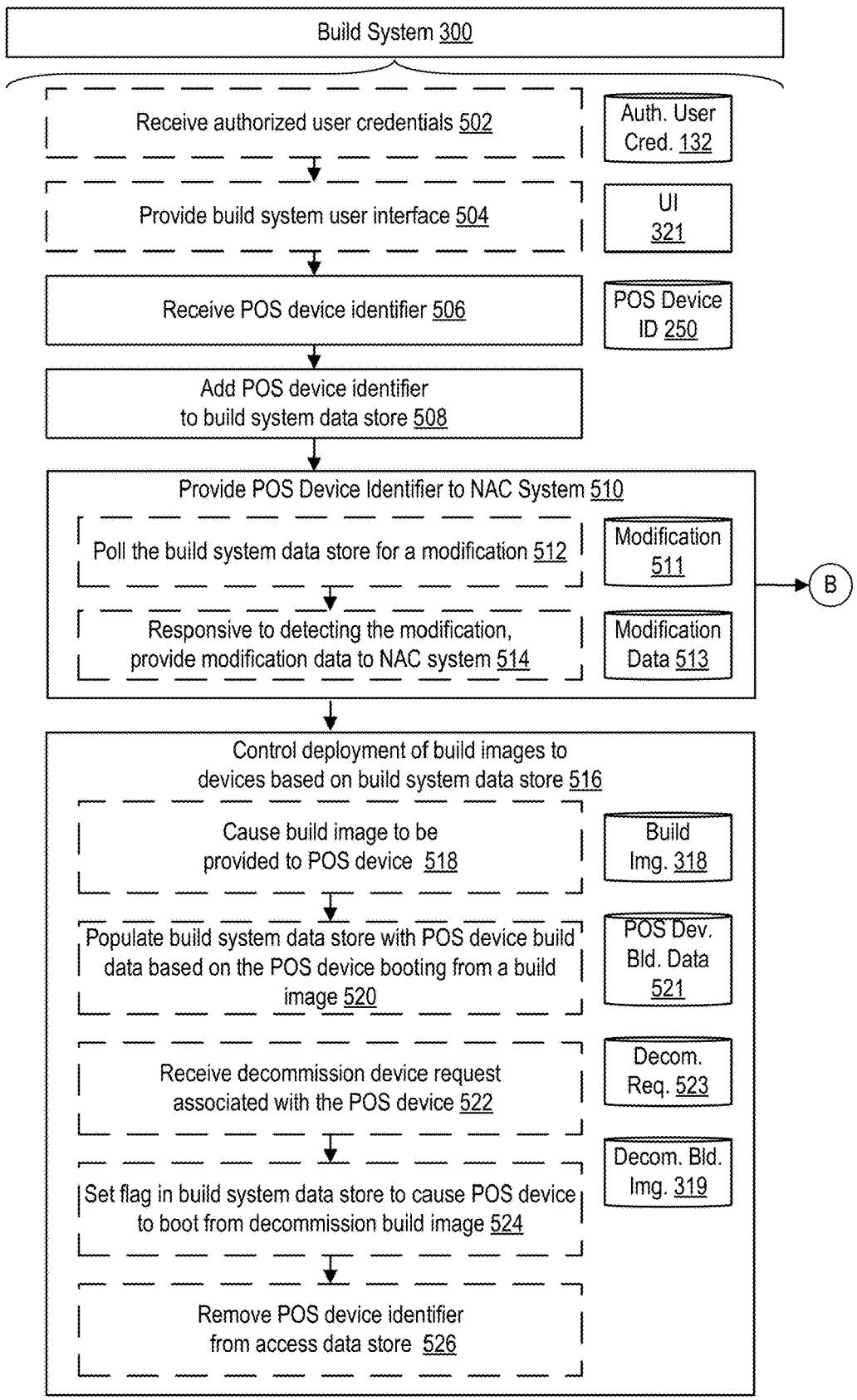
FIG. 5, which is made up of FIG. 5A and FIG. 5B, illustrates an example method for managing network access control and controlling build processes from a central build system.
Figure 5B:
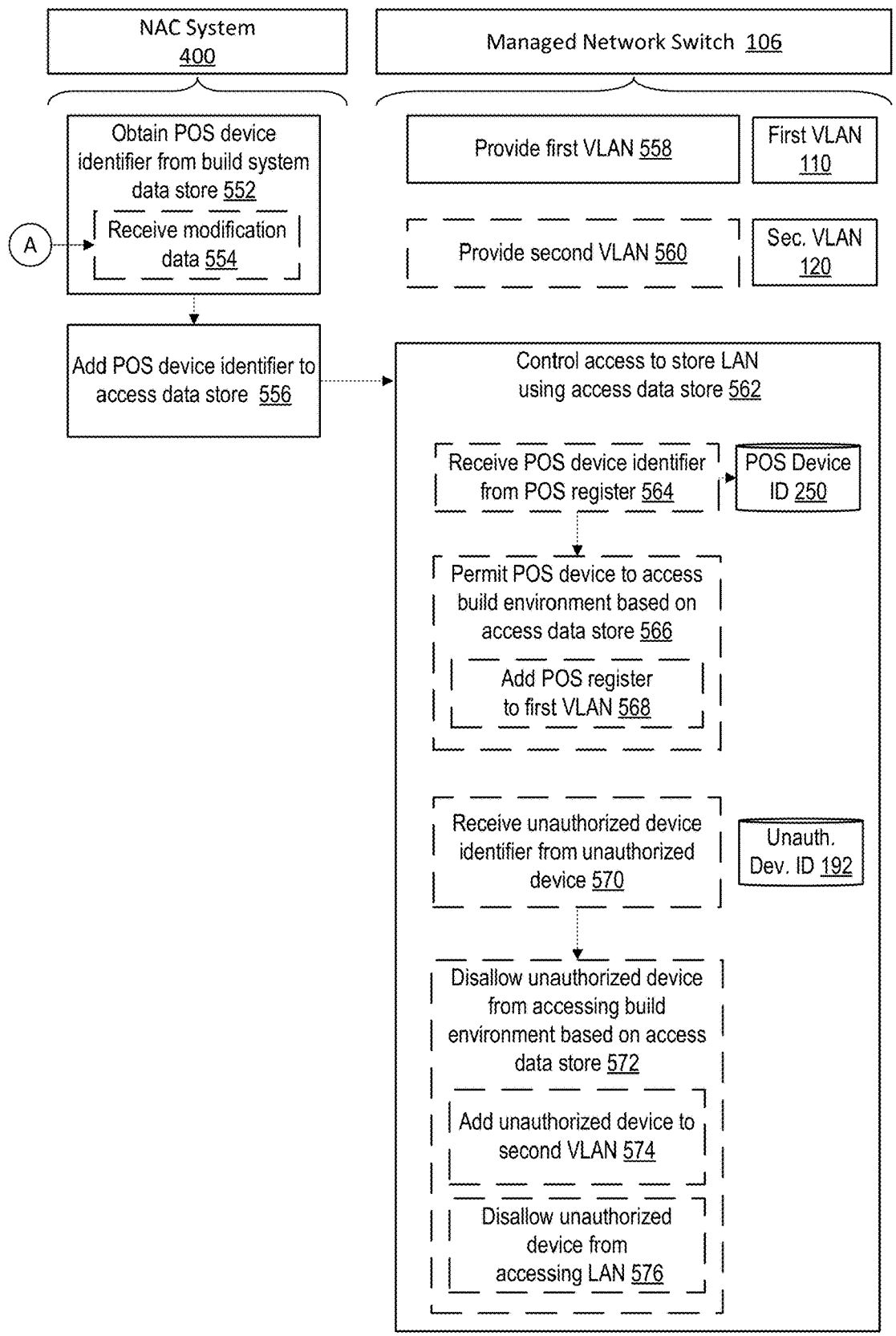

FIG. 5, which is made up of FIG. 5A and FIG. 5B, illustrates an example method 500 for managing network access control and controlling build processes from the build system 300 and using the NAC system 400 and the managed network switch 106.

The method 500 optionally includes operation 502. At operation 502, the build system 300 receives authorized user credentials 132. The authorized user credentials 132 are data used to authenticate a user as a user authorized to take an action with respect to the build system 300. In many examples, the user credentials 132 are a username and password combination associated with an account of an authorized user. The build system 300 receives the authorized user credentials 132 in any of a variety of ways, such as receiving the credentials from the administrator device 130 over a login screen provided by the build system 300. The build system 300 can authenticate the user credentials 132, such as by comparing the user credentials with credentials of a known authorized user or account. Following operation 502, the flow of the method 500 optionally moves to operation 504.

The method 500 optionally includes operation 504. At operation 504, the build system 300 provides a build system user interface 321. In an example, the build system 300 provides the build system user interface 321 responsive to authenticating the authorized user credentials 132 received in operation 502. The build system user interface 321 is an interface that allows a user to control one or more aspects of the build system 300 and the NAC system 400. In an example, the build system user interface 321 includes a form having fields through which data can be received from the authorized user. For instance, the form includes a device name field for receiving a name for a device and a device identifier field for receiving a device identifier. In an example, the build system user interface 321 is provided over a web interface (e.g., as a part of a web page).

At operation 506, the build system 300 receives a POS device identifier 250. The POS device identifier 250 is data usable to usefully identify the POS device 200. In many examples, the POS device identifier 250 is a Media Access Control (MAC) address of the POS device 200 (e.g., the MAC address of a network interface card of the POS device 200). In addition to or instead of the MAC address, the POS device identifier 250 can include operating system data of the POS device 200, patch data of the POS device 200, device mode data of the POS device 200, a serial number of the POS device 200, a model number of the POS device 200, a name of the POS device, an IP (Internet Protocol) address of the POS device, a device fingerprint of the POS device 200, other identifiers, or combinations thereof. In an example, the build system 300 receives the POS device identifier 250 from the administrator device 130. For instance, the build system 300 receives the POS device identifier 250 over the build system user interface 321. Following operation 506, the flow of the method 500 moves to operation 508.

At operation 508, the build system 300 adds the POS device identifier 250 to the build system data store 314. In an example, the build system 300 uses an API (Application Programming Interface) specifying the POS device identifier 250 to add the POS device identifier 250 to the build system data store 314. In many examples, the build system data store 314 is a database, and adding the POS device identifier 250 to the build system data store 314 includes adding a row to the database having the POS device identifier 250 in a field of the database for storing a device identifier. In an example, the operation 508 is performed responsive to an element (e.g., form-submit button) being activated on the build system user interface 321. Following operation 508, the flow of the method 500 moves to operation 510.

At operation 510, the build system 300 provides the POS device identifier 250 to the NAC system 400. The build system 300 provides the POS device identifier 250 to the NAC system 400 in any of a variety of ways. In some examples, the build system 300 sends a message to the NAC system 400 that includes the POS device identifier 250. In some examples, a same action that causes the build system 300 to add the POS device identifier 250 to the build system data store 314 also causes the build system 300 to provide the POS device identifier 250 to the NAC system 400. For instance, in some examples, the operation 510 is performed responsive to a user-interface element (e.g., a form-submit button) being activated on the build system user interface 321. In some examples, the build system 300 provides the POS device identifier 250 to the NAC system 400 based on polling the build system data store 314, as described in operations 512 and 514, below. Following operation 510, the flow of the method 500 moves to operation 516 of FIG. 5A and/or operation 552 of FIG. 5B.

At operation 512, the build system data store 314 is polled for a modification 511. In many examples, the build system 300 polls the build system data store 314, though other systems or components can perform the polling. The modification 511 is a change in the build system data store 314. In an example, the modification is the addition of, removal of, or change to a POS device identifier 250 within the build system data store 314. In an example, the build system 300 includes a process that periodically polls the build system 300 for a modification 511. Upon detection of the modification 511, the flow of the method 500 moves to operation 514.

At operation 514, the build system 300 provides modification data 513 to the NAC system 400 responsive to detecting the modification 511. The modification data 513 is data describing the modification 511. For instance, where the modification 511 is the addition of the POS device identifier 250 to the build system data store 314, the modification data 513 can include the POS device identifier 250. The modification data 513 can further include an indication of what the modification 511 is, such as the addition or deletion of a POS device identifier 250. The modification data 513 can be provided to the NAC system 400 in any of a variety of ways, including providing the modification data 513 using an API associated with the NAC system 400.

At operation 516, the build system 300 controls deployment of a build image 318 or other software packages to devices based on the build system data store 314. In an example, the build system 300 causes the build image 318 or other software packages to be deployed to the POS device 200 as described in operation 518 and operation 520. In another example, the build system 300 causes a decommission process to occur, as described in operation 522, operation 524, and operation 526. In some examples, the build system 300 controls deployment based on the build system 300 identifying a new entry in the build system data store 314 (e.g., based on detecting the modification 511). In other examples, the build system 300 controls deployment based on new software packages (e.g., the build system 300 causes deployment of a new version of software responsive to the new version becoming available). In still other examples, the build system 300 controls deployment based on scheduled intervals. In examples, controlling deployment further includes providing information regarding deployment status, such as over the build system user interface 321 to an authorized user.

At operation 518, the build system 300 causes the build image 318 to be provided to the POS device 200. For instance, the build system 300 determines particular software packages to provide to the POS device 200 (e.g., based on a name of the POS device 200, based on a type of the POS device 200, based on user selection of a particular software package, or combinations thereof) and causes the deployment of the build image 318 or other software packages to the POS device 200 (e.g., by directly causing the deployment or doing so through another system, such as via the build environment 112). Following operation 518, the flow of method 500 moves to operation 520.

At operation 520, the build system 300 populates the build system data store 314 with POS device build data 521. The POS device build data 521 is data regarding the POS device 200. The POS device build data 521 includes, for example, data identifying software deployed to the POS device 200 (e.g., names and versions of software operating on the POS device 200), data regarding hardware of the POS device 200 (e.g., descriptions of the hardware), a status of a software package deployment process (e.g., whether software packages were deployed successfully, whether an error or warning occurred during deployment), license information regarding software packages, operating on the POS device 200, networking data (e.g., an IP address of the POS device), other data, and combinations thereof. The POS device build data 521 is typically provided by the POS device 200 based on the POS device 200 after a software package is installed. For instance, the data is provided after the POS device 200 boots from the build image 318. For instance, after the POS device 200 boots from the build image, the POS device provides the POS device build data 521 to the build system 300. In other examples, the build system 300 polls or otherwise requests the POS device build data 521 from the POS device 200.

At operation 522, the build system 300 receives a decommission device request 523 associated with the POS device 200. The decommission device request 523 is a request to decommission the POS device 200. For instance, the POS device 200 may be being temporarily or permanently removed from service (e.g., to be transported to another store, sold, recycled, or destroyed). The decommission device request 523 typically includes the POS device identifier 250. In many examples, the decommission device request 523 is requested over the build system user interface 321. Following operation 522, the flow of the method 500 moves to operation 524.

At operation 524, the build system 300 sets a flag (e.g., a decommission flag) in the build system data store 314 to cause the POS device 200 to boot from a decommission build image 319. In an example, setting the flag automatically causes the build system 300 to begin a decommission process. In another example, build system data store 314 is polled to determine whether a flag is set for an entry and begins a decommission process for POS devices 200 associated with entries in the build system data store 314 having a set flag. Following operation 524, the flow of the method 500 moves to operation 526.

At operation 526, the build system 300 removes the POS device identifier 250 from the access data store 414. In an example, the POS device identifier 250 is removed from the access data store 414 responsive to determining that the POS device 200 booted from or likely booted from the decommission build image 319. In an example, the POS device identifier 250 is removed from the access data store 414 responsive to determining that the POS device 200 completed a decommission process.

Turning to FIG. 5B, at operation 552, the NAC system 400 obtains POS device identifier 250 from the build system data store 314. The NAC system 400 can obtain the POS device identifier 250 from the build system data store 314 in a variety of ways. In some examples, the NAC system 400 pulls the POS device identifier 250. For instance, the NAC system 400 periodically requests POS device identifiers 250 from the build system 300, such as over an API. In response to a pull request, the build system 300 responds with a complete list of POS device identifiers 250 (e.g., all POS device identifiers 250 in the build system data store 314) or a subset of a complete list of POS device identifiers 250 (e.g., modified POS device identifiers or only those POS device identifiers 250 meeting certain criteria, such as the POS device identifiers 250 of POS devices 200 in a store 101 associated with the NAC system 400). In some examples, the POS device identifier 250 is pushed to the NAC system 400 by the build system 300. The POS device identifier 250 can be provided to the NAC system over an API of the NAC system. In some examples, the POS device identifier 250 is obtained in the form of modification data 513 as described in operation 554.

At operation 554, the NAC system 400 receives the modification data 513. Following operation 514, the build system 300 provides the modification data 513 to the NAC system 400. In operation 554, the NAC system 400 receives the modification data 513. This operation 554 can further involve extracting the POS device identifier 250 from the modification data 513 by parsing the modification data 513 for the POS device identifier 250. Following operation 552 or operation 554, the flow of the method 500 moves to operation 556.

At operation 556, the NAC system 400 adds the POS device identifier 250 to the access data store 414. In an example, the NAC system 400 uses an API specifying the POS device identifier 250 to add the POS device identifier 250 to access data store 414. In many examples, the access data store 414 is a database, and adding the POS device identifier 250 to the build system data store 314 includes adding a row to the database having the POS device identifier 250 in a field of the database for storing a device identifier. In an example, the operation 556 is performed responsive to operation 552 or operation 554. Following operation 556, the flow of the method 500 moves to operation 562, which is described in relation to the managed network switch 106.

At operation 558, the managed network switch 106 provides the first VLAN 110. At operation 560, the managed network switch 106 provides the second VLAN 120. Providing the first VLAN 110 and the second VLAN 120 can be performed in a variety of manners. In many examples, the managed network switch 106 provides VLANs dynamically. Dynamically providing VLANs includes assigning a device to a VLAN based on an identifier of a device (e.g., typically the MAC address of the device), which may be the same as the POS device identifier 250. In other examples, the VLAN is provided based on a protocol of traffic. In other examples, the VLAN is provided statically based on a port associated with a particular device. In some examples, the managed network switch 106 may include or cooperate with a VLAN management policy server to provide VLAN capabilities.

At operation 562, the managed network switch 106 controls access to the store LAN 104 using the access data store 414. Controlling access can take a variety of forms. In many examples, DHCP (Dynamic Host Configuration Protocol) services are denied to a device that is not on a permitted device list of the access data store 414. In an example, the managed network switch 106 reacts to messages based on whether an identifier of the device is in the access data store 414. Example operations for controlling access to the store LAN 104 based on the access data store 414 are described in relation to operation 564 and operation 570.

At operation 564, the managed network switch 106 receives the POS device identifier 250 from the POS device 200. For instance, the managed network switch 106 receives a DHCP broadcast when the POS device 200 joins the store LAN 104. The DHCP broadcast includes the POS device identifier 250 or a portion thereof.

At operation 566, the managed network switch 106 permits the POS device 200 to access the build environment 112 based on the access data store 414. In some examples, the managed network switch 106 permits the POS device 200 to access the build environment 112 based on the access data store by determining that the POS device identifier 250 is within a permitted device list of the access data store 414 and/or not on a prohibited device list of the access data store 414. Permitting access can include responding to a DHCP broadcast by the POS device 200 and providing DHCP services to the POS device 200. In some examples, the operation 566 further includes operation 568.

At operation 568, the managed network switch 106 adds the POS device 200 to the first VLAN 110. In this manner, the POS device 200 is treated as being part of the first VLAN 110, and the first VLAN 110 permits access to the build environment 112 by connected devices.

At operation 570, the managed network switch 106 receives an unauthorized device identifier 192 from an unauthorized device 190. For instance, the managed network switch 106 receives a DHCP broadcast from the unauthorized device 190 when the unauthorized device 190 joins the store LAN 104. The DHCP broadcast includes the unauthorized device identifier 192 or a portion thereof.

At operation 572, the managed network switch 106 disallows the unauthorized device 190 from accessing the build environment 112 based on the access data store 414. In some examples, this operation 572 includes determining that the unauthorized device identifier 192 is not within an allow list of the access data store 414 or determining that the unauthorized device identifier 192 is within a disallow list of the access data store 414. Responsive to this determination, the managed network switch 106 can take a variety of actions, including those described in operation 574 and operation 576.

At operation 574, the managed network switch 106 adds the unauthorized device 190 to the second VLAN 120. In this manner, the unauthorized device 190 is treated as being part of the second VLAN 120, and the second VLAN 120 lacks access to the build environment 112.

At operation 576, the managed network switch 106 disallows the unauthorized device 190 from accessing the store LAN 104. In some examples, this operation 576 includes ignoring the DHCP broadcast by the unauthorized device 190 and/or denying DHCP services to the unauthorized device.

Figure 6:
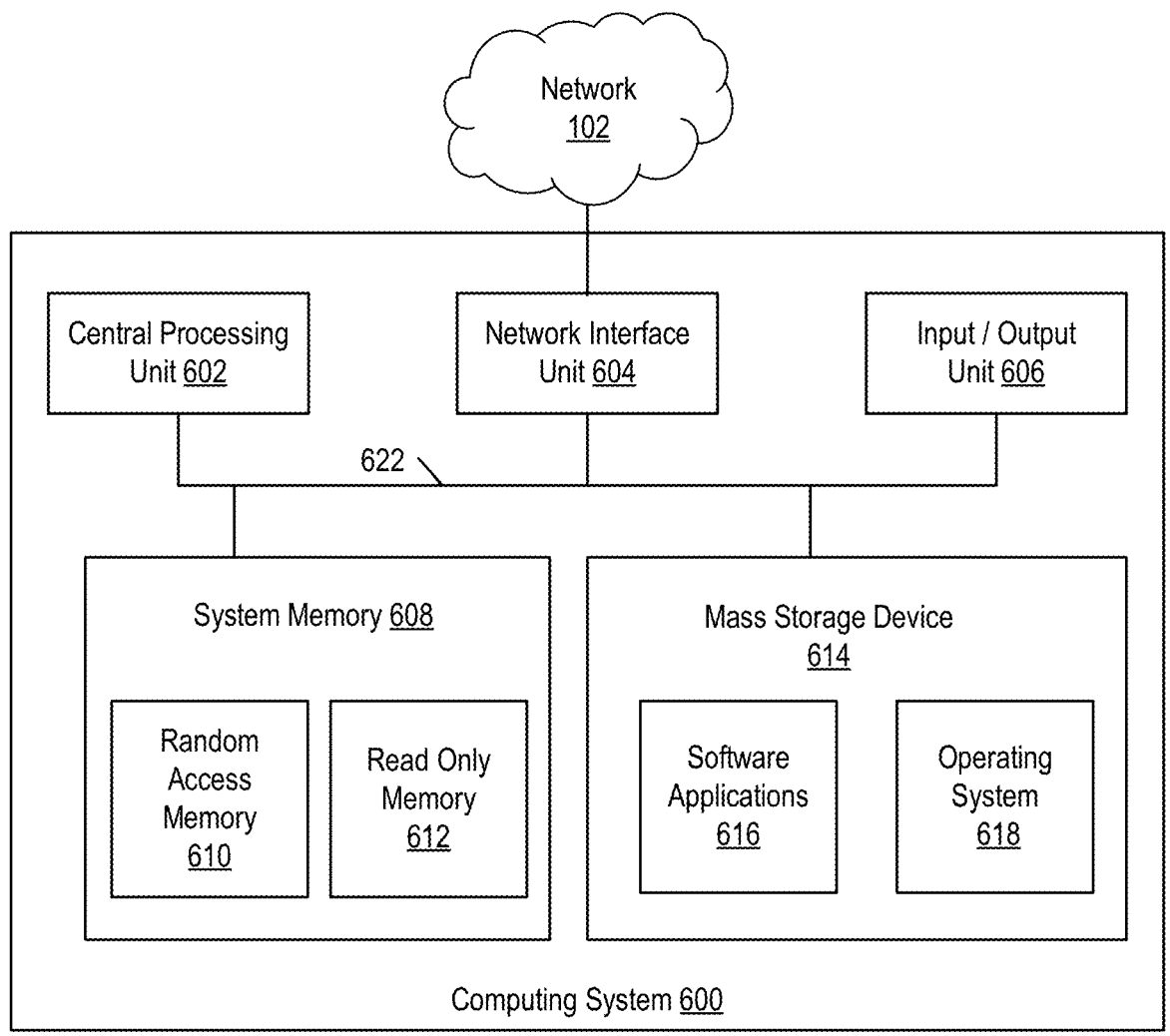
FIG. 6 illustrates an example block diagram of a computing system.

FIG. 6 illustrates an example block diagram of a computing system 600. One or more aspects of the computing system 600 can be used to implement the POS device 200, the build system 300, the NAC system 400, or other devices or components of the system 100.

In the embodiment shown, the computing system 600 includes at least one CPU (Central Processing Unit) 602, a system memory 608, and a system bus 622 that couples the system memory 608 to the CPU 602. The system memory 608 includes RAM (Random Access Memory) 610 and ROM (Read-Only Memory) 612. A basic input/output system that contains the basic routines that help to transfer information between elements within the computing system 600, such as during startup, is stored in the ROM 612. The computing system 600 further includes a mass storage device 614. The mass storage device 614 is able to store software instructions and data. In many examples, the POS device processor 204, the build system processor 304, and the NAC system processor 404 are each implemented as the at least one CPU 602.

The mass storage device 614 is connected to the CPU 602 through a mass storage controller (not shown) connected to the system bus 622. The mass storage device 614 and its associated computer-readable data storage media provide non-volatile, non-transitory storage for the computing system 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 600.

In many examples, the POS device memory 210, the build system memory 310, and the NAC system memory 410 are each implemented as a separate mass storage device 614 and/or system memory 608. In an example, when a build image 318 is an image of the entirety of a system memory 608 and/or a mass storage device 614 of the POS device 200.

According to various embodiments of the invention, the computing system 600 may operate in a networked environment using logical connections to remote network devices through the network 102. The computing system 600 may connect to the network 102 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the CPU 602, cause one or more of the systems, devices, or components described herein to provide functionality described herein. For example, the mass storage device 614 and/or the RAM 610 can store software instructions that, when executed by the CPU 602, cause the computing system 600 to receive and execute managing network access control and build system processes.

The invention claimed is:

1. A system comprising:
   a store LAN (Local Area Network) comprising:
      a managed network switch; and
      a Point of Sale (POS) device having a POS device identifier and a communication link to the managed network switch;
   a build system remote from the store LAN and comprising:
      build system memory comprising build system instructions that when executed by a build system processor cause the build system processor to:
         receive the POS device identifier;
         add the POS device identifier to a build system data store;
         provide the POS device identifier to a Network Access Control (NAC) system; and control deployment of a build image to devices based on the build system data store; and the NAC system comprising:
NAC system memory comprising NAC system instructions that when executed by a NAC system processor cause the NAC system processor to:
obtain the POS device identifier; and
add the POS device identifier to an access data store,
wherein the managed network switch is a computer networking device configured to control access to other devices connected to the store LAN using the access data store and is further configured to:
provide a first VLAN (Virtual LAN);
provide a second VLAN; and
permit devices connected to the first VLAN to access a build environment managed by the build system; and
disallow devices connected to the second VLAN from accessing the build environment,
wherein controlling access to the store LAN using the access data store includes:
adding the POS device to the first VLAN based on the POS device identifier of the POS device being located in the access data store.

2. The system of claim 1, wherein the POS device identifier is a Media Access Control (MAC) address of the POS device.

3. The system of claim 1,
wherein the POS device identifier comprises:
a Media Access Control (MAC) address of the POS device; and
one or more of: operating system data of the POS device, patch data of the POS device, or device mode data of the POS device.

4. The system of claim 1,
wherein the build system instructions further cause the build system processor to:
poll the build system data store for changes; and
responsive to determining a modification, provide modification data to the NAC system, wherein the modification data comprises the POS device identifier; and
wherein obtaining the POS device identifier from the build system data store comprises receiving the modification data.

5. The system of claim 1,
wherein the communication link is a wired connection from the POS device to the managed network switch.

6. The system of claim 1,
wherein the build system is configured to provide a build system user interface; and
wherein receiving the POS device identifier comprises receiving the POS device identifier over the build system user interface.

7. A method comprising:
receiving a Point of Sale (POS) device identifier associated with a POS device;
adding the POS device identifier to a build system data store;
control deployment of a build image to be provided to the POS device based on the build system data store;
providing the POS device identifier from the build system data store to a network access control system;
adding the POS device identifier to an access data store;
receiving, at a managed network switch of a store LAN (Local Area Network), the POS device identifier from the POS device over a communication link, wherein the managed network switch is a computer networking device configured to control access to other devices connected to the store LAN using the access data store; and permitting, by the managed network switch, the POS device to access a build environment based on the POS device identifier being within the access data store, wherein permitting the POS device to access the build environment comprises adding the POS device to a first VLAN (Virtual LAN) of the store LAN, wherein the first VLAN is associated with the build environment; and disallowing an unauthorized device from accessing the build environment, wherein disallowing the unauthorized device from accessing the build environment comprises adding the unauthorized device to a second VLAN of the store LAN, the second VLAN lacking access to the build environment.

8. The method of claim 7, further comprising:
receiving, at the managed network switch and from the unauthorized device, an unauthorized device identifier associated with the unauthorized device; and
disallowing the unauthorized device from accessing the build environment based on the unauthorized device identifier being absent from the access data store.

9. The method of claim 8, wherein disallowing the unauthorized device from accessing the build environment comprises disallowing the unauthorized device from joining the store LAN.

10. The method of claim 7, further comprising:
cause the build image to be provided to the POS device to cause the POS device to boot from the build image; and
populating the build system data store with POS device build data based on the POS device booting from the build image.

11. The method of claim 7, further comprising:
receiving a decommission device request associated with the POS device;
setting a flag in the build system data store to cause the POS device to boot from a decommission build image; and
removing the POS device identifier from the access data store responsive to determining that the POS device booted from the decommission build image.

12. A method comprising:
receiving authorized user credentials from an administrator device;
providing a build system user interface to the administrator device;
receiving over the build system user interface a POS device identifier of a POS device;
adding the POS device identifier to a build system data store;
polling the build system data store for a modification;
providing modified data to a Network Access Control (NAC) system to allow a device associated with the modified data to access a build system;
causing the POS device to boot from a build image based on the build system data store;
after causing the POS device to boot from the build image, receiving POS device build data from the POS device;
populating the build system data store with the received POS device build data; and
receiving, over the build system user interface, a decommission device request associated with the POS device; and setting a flag in the build system data store to cause the POS device to boot from a decommission build image; and providing the POS device identifier to the NAC system to disallow the POS device from accessing the build system responsive to determining that the POS device booted from the decommission build image.

13. The method of claim 12, wherein the modification includes an addition or removal of a device identifier; and wherein the received POS device build data includes data identifying software deployed to the POS device and data regarding hardware of the POS device.

14. The method of claim 12, wherein providing the modified data to the NAC system includes providing the modified data using an API (Application Programming Interface) associated with the NAC system.

* * * * *